(12) United States Patent
Charrak et al.

(10) Patent No.: US 10,555,537 B2
(45) Date of Patent: Feb. 11, 2020

(54) COMPOSITION FOR LOW-GLUTEN AND LOW-CARBOHYDRATE BAKED AND PASTRY GOODS

(71) Applicants: Samir Charrak, Bobenheim-Roxheim (DE); Monika Charrak, Bobenheim-Roxheim (DE)

(72) Inventors: Samir Charrak, Bobenheim-Roxheim (DE); Monika Charrak, Bobenheim-Roxheim (DE)

( * ) Notice: Subject to any disclaimer, the term of this patent is extended or adjusted under 35 U.S.C. 154(b) by 0 days.

(21) Appl. No.: 15/320,680

(22) PCT Filed: Jun. 25, 2015

(86) PCT No.: PCT/EP2015/064364
§ 371 (c)(1),
(2) Date: Dec. 20, 2016

(87) PCT Pub. No.: WO2015/197760
PCT Pub. Date: Dec. 30, 2015

(65) Prior Publication Data
US 2017/0150730 A1 Jun. 1, 2017

(30) Foreign Application Priority Data
Jun. 26, 2014 (DE) .................. 10 2014 009 654

(51) Int. Cl.
| | |
|---|---|
| A21D 13/064 | (2017.01) |
| A21D 13/40 | (2017.01) |
| A23L 33/00 | (2016.01) |
| A23L 33/19 | (2016.01) |
| A23L 33/22 | (2016.01) |
| A23L 25/00 | (2016.01) |
| A21D 2/26 | (2006.01) |
| A21D 2/36 | (2006.01) |
| A21D 8/00 | (2006.01) |
| A21D 10/00 | (2006.01) |

(52) U.S. Cl.
CPC .......... *A21D 13/064* (2013.01); *A21D 2/262* (2013.01); *A21D 2/264* (2013.01); *A21D 2/36* (2013.01); *A21D 2/362* (2013.01); *A21D 2/364* (2013.01); *A21D 8/00* (2013.01); *A21D 10/005* (2013.01); *A21D 13/40* (2017.01); *A23L 25/30* (2016.08); *A23L 33/19* (2016.08); *A23L 33/22* (2016.08); *A23L 33/30* (2016.08); *A23V 2002/00* (2013.01)

(58) Field of Classification Search
CPC ...... A21D 13/064; A21D 2/262; A21D 2/264; A21D 2/36; A21D 2/362; A21D 2/364; A21D 8/00; A21D 10/005; A21D 13/04; A23L 25/30; A23L 33/19; A23L 33/22; A23L 33/30
See application file for complete search history.

(56) References Cited

U.S. PATENT DOCUMENTS

2010/0303997 A1* 12/2010 Fulton ................... A21D 2/36
426/601
2014/0161963 A1 6/2014 Bernacchi

FOREIGN PATENT DOCUMENTS

WO 2007137578 A1 12/2007

OTHER PUBLICATIONS

"What is Coconut Flour" Aug. 20, 2013 http://bakingbites.com/2013/08/what-is-coconut-flour/ (Year: 2013).*
Notification of Transmittal of Copies of Translation of the International Preliminary Report on Patentability issued for PCT Application No. PCT/EP2015/064364 filed Jun. 25, 2015.
International Search Report of the International Searching Authority dated Aug. 13, 2015 for PCT/EP2015/064364.
Anonymous et al. "Seed Crispbread Baking Mix with Chia Seeds", GNPD pp. 1-2, (2014).
Callejo, Maria Jesus, "Present Situation on the Descriptive Sensory Analysis of Bread", Journal of Sensory Studies 26 (2011) 255-268, May 18, 2011, 255-268.
Guinard, Jean-Xavier, et al., "The sensory perception of texture and mouthfeel", Trends in Food Science & Technology Jul. 1996 (vol. 7), Jul. 1996, 213-219.

* cited by examiner

*Primary Examiner* — Katherine D Leblanc
(74) *Attorney, Agent, or Firm* — Saul Ewing Arnstein & Lehr LLP

(57) ABSTRACT

The present invention relates to a composition for preparing low-gluten and low-carbohydrate baked and pastry goods, containing the following ingredients: a) flour, obtained from one or more nuts and/or oil seeds of non-legumes, b) mucilage polysaccharide-containing plant products or mucilage polysaccharides isolated from these plant products, c) protein component consisting of at least 40% animal protein in the dry weight. Such a composition contains a maximum of 0.1% gluten and is preferably gluten-free, i.e. has a gluten content less than 20 mg/kg (<20 ppm gluten content). Due to the low gluten and carbohydrate content of components a), b) and c), the composition according to the invention is suitable for producing low-gluten and in particular preferably gluten-free baked and pastry goods, having a low carbohydrate content of generally <15% relative to the food ready for consumption, and in particular for production of low-gluten, preferably gluten-free baked and pastry goods, which, relative to food ready for consumption, have the following nutrient profile: less than 10% carbohydrates, more than 10% protein, 1-40% fat.

26 Claims, No Drawings

COMPOSITION FOR LOW-GLUTEN AND LOW-CARBOHYDRATE BAKED AND PASTRY GOODS

CROSS-REFERENCE TO RELATED APPLICATIONS

This application is the U.S. national phase, pursuant to 35 U.S.C. § 371, of PCT international application Ser. No. PCT/EP2015/064364, Jun. 25, 2015, designating the United States and published in German on Dec. 30, 2015 as publication WO 2015/197760A1, which claims priority under 35 U.S.C. § 119(a) to German patent application No. 10 2014 009 654.8, filed Jun. 26, 2014. The entire disclosures of the aforementioned patent application is hereby incorporated herein by reference.

DESCRIPTION

The present invention relates to a composition for preparing low-gluten and low-carbohydrate bakery products and farinaceous goods, containing the following constituents:
a) flour obtained from one or more shell fruits and/or oil seeds of non-legumes,
b) mucilaginous polysaccharide-containing plant product or mucilaginous polysaccharides isolated from said plant product,
c) protein component that comprises in the dry matter at least 40% animal protein.

Such a composition contains a maximum of 0.1% gluten and is preferably gluten-free, i.e. it has a gluten content of less than 20 mg/kg (<20 ppm gluten content). Owing to the low gluten and carbohydrate contents of the components a), b) and c), the composition according to the invention is suitable for preparing low-gluten, in particular preferably gluten-free, bakery products and farinaceous goods having low carbohydrate contents of generally <15%, based on the ready-to-eat food, and in particular for preparing low-gluten, in particular preferably gluten-free, bakery products and farinaceous goods that have the following nutrient profile, based on the ready-to-eat food: less than 10% carbohydrates, more than 10% protein, 1-40% fat.

A low-carbohydrate diet is a health trend that is becoming increasingly established worldwide. If at one time it was mainly diabetics that had to pay heed to the carbohydrate content of their foods, now more and more people are recognizing the health advantages of a low-carbohydrate diet.

Carbohydrates are not an essential component of food, since the body is able to produce itself the carbohydrates necessary for brain functioning by gluconeogenesis from proteins and glycerol. In contrast, many components of proteins (amino acids) and also fats (fatty acids) are essential and must be supplied via food, in order to permit and maintain important body functions. Nowadays in the western world less and less heavy manual work is being carried out, and our energy requirement has markedly decreased. Nevertheless, certain amounts of essential fatty acids and amino acids are still necessary. In order to correspond to the reduced energy requirement, therefore a reduction in carbohydrates is the means of choice.

The consumption of carbohydrates, in particular glucose and starch, leads to an increase in the blood sugar level, a consequence of which is the increased release of insulin. Insulin causes the blood sugar (glucose) to be stored as glycogen and at the same time prevents the release of previously stored energy. A high insulin level causes the blood sugar level to decrease (sometimes rapidly) which gives rise to a renewed feeling of hunger. A carbohydrate-rich diet ultimately leads to the hormone system permanently being set to energy storage, as a result of which in the case of an excess of supplied calories, the energy stores (fat tissue) constantly enlarge further. The attempt to decrease the excess fat tissue by calorie-reduced diets frequently fails because, owing to fluctuations in blood sugar, an increased number of intensive hunger attacks occurs. Frequently varying blood sugar levels, as are caused by a carbohydrate-rich diet, are, furthermore, connected with the occurrence of insulin resistance and a development of type 2 diabetes disorders.

If fewer carbohydrates, in particular less sugar and starch, are fed to the body, these blood sugar fluctuations owing to high insulin secretions can be kept small. In this case the energy supply of the body by body fat (ketose) is stimulated and a reduction of the excess fat reserves is facilitated. In the low-carbohydrate diet form, in addition, higher amounts of protein and fat are consumed, which, in addition, has a beneficial effect on the feeling of saturation. In addition, this ensures that the body is optimally supplied with essential amino acids and fatty acids.

In the changeover to a low-carbohydrate diet, numerous habits must be given up that were learnt with the conventional carbohydrate-rich diet. It is generally found to be particularly difficult to give up bakery products and farinaceous goods, in particular bread.

The expression "conventional foods" or "conventional bakery products and farinaceous goods" is taken to mean carbohydrate-rich foods or bakery products and farinaceous goods which are prepared on the basis of the flours of the conventional cereal types such as wheat, rye, oats, barley etc. and generally have a carbohydrate content of >40%.

The constantly expanding health trend of the low-carbohydrate diet has promoted the development of numerous novel products which are intended to ease the changeover in those wanting to diet. One of said products is what is termed "protein bread", also known as "low-carb bread" which has a greatly decreased carbohydrate content. In order to achieve a suitable nutrient profile for the low-carbohydrate diet, these breads are generally prepared using large amounts of gluten, usually in combination with soybean flour, oil seeds and smaller amounts of wholegrain wheat flour.

Foods are generally termed to be low-carbohydrate when they have a carbohydrate fraction of <15%, preferably of <10%, based on the ready-to-eat food, wherein the carbohydrate fraction is taken to mean the fraction of utilizable carbohydrates, i.e. carbohydrates which can be converted to sugars by the human body in the small intestine. Carbohydrates that are not utilizable in the small intestine, such as dietary fibers, are not counted as part of the carbohydrate fraction.

DE 202011107231U1 describes, for example, a composition that comprises 15-30% gluten and as further main components oil seeds and soy products.

WO2012/076911A2 describes a low-carbohydrate flour mixture which principally comprises various dietary fiber-rich plant components and up to 45% gluten. Such compositions are in recent years being increasingly offered in online shops, delicatessens and in the interim even by discount food retailers. Many of the compositions of this type contain less than 10% carbohydrates in the ready-to-eat product. However, many such products, owing to the high amounts of oil seeds used, also have a relatively high fat proportion. Although the nutrient fat is generally not considered a problem in the low-carbohydrate diet type, a high fat proportion can lead to increased energy density compared with conventional foods. This is a problem, in particular, when the low-carbohydrate type of diet is to be used for weight reduction and accompanies a calorie-reduced diet.

Principally, however, the high gluten fraction of the novel protein-rich foods can be very problematic, which gluten fraction is sometimes markedly higher than that in conventional foods.

Gluten has a critical effect on the rheological properties of a dough. By water absorption, gluten forms an elastic mass and makes the dough extensible. It therefore permits an increase in volume via the gases released during the baking process (gas retention capacity) and stabilizes the expanding gas cells, which ensures an aerated light bakery product with stable crumb.

However, there is an increasing number of disease patterns which are caused by a health-damaging action of gluten on the human body. In this case, a differentiation is generally made between a chronic bowel inflammation in the form of an autoimmune disease (celiac disease) and a gluten sensitivity that in turn can have differing manifestations.

In the event of celiac disease, the consumption of gluten-comprising food leads to a serious immune reaction with symptoms such as weight loss, diarrhea, nausea, loss of appetite, tiredness and depression. It is assumed that approximately 1% of the population in the western world suffers from celiac disease.

Other diseases in which gluten has adverse effects on the body are summarized under the expression gluten sensitivity. The numerous symptoms observed to date include, inter alia, flatulence, abdominal complaints, diarrhea, headaches, migraines, lethargy and tiredness, attention deficit disorder and hyperactivity, schizophrenia, muscle complaints and also bone and joint pains. Relatively recent research shows that the gluten component gliadin increases the permeability of the small intestine cells and thereby makes the intestine permeable to food proteins. In addition, it is assumed that the development of gluten sensitivity is promoted by frequent consumption of high-gluten foods.

There is therefore a constantly growing fraction of the population which has to or wants to eat gluten-free for health reasons. For this purpose, numerous gluten-free products have been developed. According to EU regulation 41/2009, foods that have a gluten content of at most 20 mg/kg (20 ppm) may be declared to be "gluten-free".

Foods that have a higher gluten content owing to production-related contamination, but to which no types at all of gluten-containing cereals, or gluten as additive, have been intentionally added, in the context of this application are termed low-gluten foods or foods with a low gluten content. The compositions described as low-gluten in the context of this application have a maximum gluten content of 0.1%. The compositions described as gluten-free in the context of this application have a maximum gluten content of 20 ppm. This limiting value is in agreement with EU regulation 41/2009.

In place of wheat flour, the flours of gluten-free plants are used, such as, for instance cornflour, potato flour, buckwheat flour, teff flour or comparable flours. Foods made from these carbohydrate-rich flours, however, are unsuitable for a low-carbohydrate type of diet. Furthermore, bread manufacture using these high-starch flours is generally difficult, since the functional properties of the gluten are absent. When, in the course of the baking process, the carbon dioxide released by baking agents such as yeast or baking powder increases the dough volume, the elastic gluten ensures that the dough possesses a sufficient gas retention capacity. Since the gluten-free flours, however, lack this binding agent for developing a bread-like crumb, chemically modified celluloses, for example, have to be added that imitate the action of gluten in the dough.

EP1561380A1 discloses, for example, a composition in which gluten-free flours are admixed with large amounts of methylcellulose in order to increase the water swelling capacity of the dough. The disadvantage of using methylcellulose in relatively high doses, however, is the laxative action thereof. In addition, the acceptance of synthetically produced foods is very low primarily with the consumers in question.

As a natural substitute for the functional properties of gluten in gluten-free products, mucilaginous dietary fibers such as psyllium products (also known as ispaghula, isabgol, psyllium, ispaghula, black psyllium, blond psyllium, French psyllium, from the plant genus *Plantago* (plantains) may be used. The health-promoting action of psyllium products on account of their high dietary fiber content and the type of dietary fibers present has long been known. However, in the multitude of publications, the gluten-free doughs in addition consist of predominantly high-starch flours. The combination of psyllium products with high-starch flours appears, however, to lead to some problems in processing, such as a rubber-like texture of the bakery products, a low stability during the baking process and also compact, lumpy or excessively sticky doughs and bakery products.

Thus, for example, in U.S. Pat. No. 5,955,123 difficulties are also reported owing to the highly hydrophilic character of the psyllium products. As a solution, the use of a special psyllium product (Metamucil®) that is finely ground and then agglomerated by adding a special binding agent is proposed, however also in combination with starch-containing flours.

A different proposed solution is disclosed in U.S. Pat. No. 5,095,008 according to which a special sequence must be maintained during mixing of the likewise high-starch flours, the remaining baking ingredients and the psyllium husk products.

In U.S. Pat. No. 5,126,150, ground psyllium husks are first coated with calcium lactate or a type of gelatin and not until then mixed with the remaining dough components, whereas U.S. Pat. No. 5,384,136 declares that the standard addition of psyllium products for preparing bread is not possible and requires extrusion thereof to form pellets with subsequent softening.

In US2010/0303997, the addition of relatively large amounts of high-starch flours for preparing high-dietary fiber and low-glycemic bakery products, in particular biscuits, is dispensed with. However, the technique described demands a special controlled hydrogenation of the mucilages and the bakery products described comprise in large parts fillers such as the sugar alcohol erythritol and further dietary fibers such as inulin, of which it is known that, in relatively large amounts, it can initiate digestive problems.

WO2011/039308A2 describes a composition which is termed not only gluten-free, but also low-carbohydrate, but, in the compositions described, likewise relatively large amounts of high-starch flours such as buckwheat flour, rice flour, cornflour, teff flour or the like are used.

In the prior art, in addition, compositions are known (gluten-free low carb white bread, manufacturer: Erdschwalbe Bioprodukte, Neu-Ulm) in which a gluten-free and low-carbohydrate bread is achieved by using relatively large amounts of soy products and oat dietary fibers. However, such a product, owing to the soy products used, has a strong off-taste and, furthermore, has a compact pore structure of the crumb that is atypical of bread. Furthermore, in the use of large amounts of soy products, it is necessary to take into account the fact that soybeans comprise what are termed antinutritive substances such as, e.g., phytates, that cannot be removed during processing. Phytates have the effect, inter alia, that minerals can be absorbed more poorly from food, since they form irreversible complexes therewith.

Therefore, a composition would be desirable for bakery products and farinaceous goods that are not only low-carbohydrate, i.e. having a fraction of utilizable carbohydrates of <15%, preferably <10%, in the ready-to-eat product, but are also low-gluten, i.e. having a gluten content <0.1% gluten and are preferably gluten-free, which predominantly comprise natural ingredients and which, furthermore, do not have other health-damaging side effects. These bakery products and farinaceous goods should have the organoleptic properties (such as taste, consistency, odor, color etc.) of conventional bakery products and farinaceous goods, or approach them very closely.

For breads and bread-like bakery products, for example, this means, in particular, a stable but flexible crumb having a uniform pore structure, a low dough density and a bread-like pleasant taste. The particular challenge is to achieve these properties despite the lack of the flexibilizing action of the gluten and also the lack of the stabilization caused by starch gelatinization during the baking operation.

It is therefore the object of the present invention to provide a novel composition that permits bakery products and farinaceous goods to be prepared that are low-carbohydrate and at the same time low-gluten, in particular are gluten-free, in particular bakery products and farinaceous goods having a content of utilizable carbohydrates of <15%, in particular <10% carbohydrates, and which overcomes the disadvantages of the prior art and permits, in particular, bakery products and farinaceous goods to be prepared that are close in terms of the organoleptic properties thereof to the corresponding conventional, that is to say high-gluten and high-carbohydrate, foods. Furthermore, the composition should be suitable to be further processed by the consumer in a simple manner in the home to form bakery products or farinaceous goods.

According to the invention, these and further objects are achieved by compositions which comprise the following components:
a) flour obtained from one or more shell fruits and/or oil seeds of non-legumes, wherein the flour comprises at least one partially deoiled flour, having a fat content of less than 30% by weight, in an amount of at least 20% by weight, in particular at least 50% by weight, especially at least 80% by weight, based on the total weight of the flour used as component a),
b) at least one mucilaginous polysaccharide-comprising plant product or at least one mucilaginous polysaccharide isolated from said plant product (component b),
c) protein component that comprises in the dry matter at least 40% animal protein (component c),
wherein the composition comprises a maximum of 0.1% gluten.

In the compositions according to the invention, the fraction of the component a) is generally at least 20% by weight, in particular at least 30% by weight, especially at least 40% by weight or at least 50% by weight, e.g. in the range from 20 to 80% by weight, in particular 30 to 75% by weight, and especially 40 to 70% by weight, or 50 to 70% by weight, based on the dry matter of the components a), b) and c). In certain embodiments, the fraction of the component a) can also be 20 to 50% by weight, for example when the composition is to be suitable for preparing noodle dough.

In the compositions according to the invention, the fraction of the component b) is generally at least 5% by weight, in particular at least 7% by weight, especially at least 10% by weight, e.g. in the range from 5 to 40% by weight, in particular 7 to 35% by weight, especially 10 to 25 or 10 to 20% by weight, based on the dry matter of the components a), b) and c). In certain embodiments, the fraction of the component b) can also be 20 to 40% by weight, for example when the composition is to be suitable for preparing noodle dough.

In the compositions according to the invention, the fraction of the component c) is generally at least 4% by weight, in particular at least 5% by weight, and especially at least 10% by weight, e.g. in the range from 4 to 40% by weight, in particular 5 to 35% by weight, especially 10 to 30% by weight, or 10 to 20% by weight, based on the total weight of the components a), b) and c). In certain embodiments, the fraction of the component c) can also be 20 to 40% by weight, for example when the composition is to be suitable for preparing noodle dough.

The fraction of the total amount of the components a), b) and c) of the composition according to the invention, in each case calculated as dry matter of the components a), b) and c), of the total dry matter of the composition according to the invention, is generally at least 50% by weight, in particular at least 60% by weight, and is, for example, in the range from 50 to 98% by weight, in particular 60 to 95% by weight. The total amount of other components, for example component d), as explained further below, other dietary fibers, plant protein isolates and baking aids, will generally not exceed 50% by weight, in particular 40% by weight, and is typically in the range from 2 to 50% by weight, in particular in the range from 5 to 40% by weight, based on the total dry matter of the composition according to the invention.

The composition comprising the components a), b) and c) is preferably gluten-free, i.e. the gluten content thereof is less than 20 mg/kg (<20 ppm gluten), based on the dry matter of the composition.

The compositions according to the invention preferably comprise less than 15% by weight of soy products based on the total amount of the dry components of the composition according to the invention.

The compositions according to the invention preferably comprise less than 1% by weight of methylcellulose.

The compositions according to the invention preferably comprise less than 5% by weight of sugar alcohols such as erythritol, xylitol, sorbitol, mannitol, lactitol or Isomalt.

The compositions according to the invention preferably comprise less than 5% by weight of inulin.

The compositions according to the invention preferably comprise less than 15% by weight, in particular less than 10% by weight, of utilizable carbohydrates.

The contents figures quoted in the context of this application in the form of percentages (%) are, unless stated otherwise, solely mass fractions, also termed as % by weight. For a carbohydrate content of 15%, based on the ready-to-eat food, this means, for example, that 100 g of the ready-to-eat food comprise 15 g of utilizable carbohydrates.

Using the composition according to the invention, bakery products and farinaceous goods may be prepared that are low-gluten, i.e. comprise less than <0.1% gluten, based on the bakery products and farinaceous goods, and which are, in particular, gluten-free, i.e. comprise <20 ppm of gluten, based on the bakery products and farinaceous goods. With the composition according to the invention, in addition, bakery products and farinaceous goods may be prepared that, in addition to the low gluten content or, in addition to the absence of gluten, are low-carbohydrate, i.e. comprise less than 15%, and in particular less than 10% of utilizable carbohydrates, and which have, in particular, the following nutrient profile: <15% carbohydrates, preferably <10% carbohydrates, >10% protein, 1-40% fat.

In a particular embodiment, the composition according to the invention is provided as a baking premix. A baking premix is taken to mean a mixture of the components a), b) and c) in solid form and optionally further solid components, which is processed together with a consumable liquid, in particular water or milk, or a fruit juice, to form a dough which is then further processed to form bakery products or farinaceous goods. This permits the consumer to prepare the corresponding bakery products and farinaceous goods in a simple manner rapidly and without complications in the domestic kitchen.

In a further embodiment, the composition according to the invention is provided as a mixture of the components a) and b) in solid form and optionally further solid components, which is processed with the component c) and a consumable liquid, in particular water or milk, or a fruit juice, to form a dough which is then further processed to form bakery products or farinaceous goods. This permits the consumer to prepare the corresponding bakery products and farinaceous goods in a simple manner rapidly and without complications in the domestic kitchen.

Using the composition according to the invention, low-carbohydrate and low-gluten, preferably gluten-free, foods, in particular bakery products and farinaceous goods, may be provided that comprise ingredients of natural origin, are not associated with health disadvantages and the organoleptic properties of which are comparable with those of conventional bakery products and farinaceous goods. Several groups of persons can immediately profit from such foods: firstly, those who, for health or other reasons, must or would like to have a low-carbohydrate diet, but at the same time do not wish to have an increase in their gluten consumption, and secondly, those who suffer from gluten intolerance, but nevertheless must or want to have a low-carbohydrate diet.

In order to obtain bakery products and farinaceous goods having the described properties, compositions have been developed in which these properties are achieved by a targeted combination of three required components. The components are described in the following section.

The component a) of the composition according to the invention, hereinafter also termed main component, preferably makes up more than 40%, particularly preferably more than 50%, of the dry ingredients of the three required components a), b) and c) of this composition. The main component comprises flour that is obtained from one or more shell fruits and/or from one or more non-leguminous oil seeds. At least part of said flour, in particular at least 50%, especially at least 80%, or the total amount of the flour, is selected from partially deoiled flours having a fat content less than 30%, in particular less than 20%, or less than 10%.

The main component is selected in such a manner that the bakery products and farinaceous goods prepared from the composition according to the invention have a carbohydrate fraction not exceeding 15%, preferably 10%.

Shell fruits, which are commonly also called "nuts" and "kernels", are taken to mean the seed storage tissue of useful plants, which come under the broad term seed fruit. Seed fruit comprises the spectrum from seeds of the gymnospermous conifers to seeds of the angiospermous plants having lignified and inedible pericarp that are harvested as fruits (Lieberei, R., Reisdorff, C., Franke, W., Nutzpflanzenkunde, 7th edition 2007, Georg Thieme Verlag KG Stuttgart). Suitable shell fruits within the meaning of the invention are, for example, stone fruits such as almonds, coconuts, apricot kernels, mango kernels, pomegranate seeds, peach stones, pecan nuts and pistachios, but also nut fruits such as walnuts, chestnuts, hazelnuts, beechnuts, acorns, hemp nuts, macadamia nuts, ivory nuts and water chestnuts, and also similarly belonging morphologically to the nuts, mesocarp nuts such as peanuts. Likewise termed shell fruits are cashew nuts, pine kernels and brazil nuts.

Non-leguminous oil seeds are understood to be oil seeds from plants that are not included in the family of Leguminosae (legumes). According to the invention, primarily flours of the following oil seeds and mixtures thereof are suitable: linseeds, golden linseeds, sunflower seeds, pumpkin seeds, sesame seeds, chia seeds, grape seeds and poppy seeds.

In a particular embodiment of the invention, the flours obtained from the shell fruits are flours that have been obtained from one or more shell fruits that are selected from the group consisting of almonds, coconuts, apricot kernels, mango kernels, pomegranate seeds, peach stones, pecan nuts, pistachios, walnuts, chestnuts, hazelnuts, beechnuts, acorns, hemp nuts, macadamia nuts, ivory nuts, water chestnuts, peanuts, cashew nuts, pine kernels and brazil nuts.

In a particular embodiment of the invention, the component a) is flours that have been obtained from one or more non-leguminous oil seeds that are selected from the group consisting of linseeds, golden linseeds, sunflower seeds, pumpkin seeds, grape seeds, sesame seeds, chia seeds and poppy seeds, in particular flours from oil seeds from the group linseeds, golden linseeds, sunflower seeds and pumpkin seeds.

As main component, a combination of a plurality of the described flours can also be used. Preferably, flours of low-carbohydrate shell fruits and/or flours of low-carbohydrate oil seeds and also combinations thereof are used, such as, e.g. flours of shell fruits, selected from almonds, walnuts, coconuts, pecan nuts, macadamia nuts, peanuts and brazil nuts, or flours from oil seeds such as linseeds, golden linseeds, sunflower seeds, pumpkin seeds, grape seeds, sesame seeds, chia seeds and poppy seeds, in particular from such as linseeds, golden linseeds, sunflower seeds and pumpkin seeds.

In preferred embodiments of the invention, the component a) comprises a mixture at least of different flours, e.g. flours of different shell fruits and/or oil seeds, or a mixture of partially deoiled flours with non-deoiled flours, e.g. a mixture of partially deoiled almond flour and partially deoiled coconut flour, a mixture of partially deoiled almond flour and non-deoiled almond flour, a mixture of partially deoiled almond flour, partially deoiled coconut flour and partially deoiled hazelnut flour, a mixture of partially deoiled almond flour, partially deoiled coconut flour and partially deoiled flax meal, a mixture of partially deoiled almond flour and partially deoiled flax meal, a mixture of partially deoiled almond flour, partially deoiled flax meal and partially deoiled pumpkin seed flour, a mixture of partially deoiled almond flour, partially deoiled flax meal and non-deoiled almond flour, a mixture of partially deoiled almond flour, partially deoiled flax meal, partially deoiled pumpkin seed flour and partially deoiled grapeseed flour, a mixture of partially deoiled coconut flour, partially deoiled flax meal, partially deoiled sesame seed flour and partially deoiled sunflower seed flour, a mixture of partially deoiled coconut flour, partially deoiled flax meal and partially deoiled pumpkin seed flour, a mixture of partially deoiled coconut flour, partially deoiled flax meal and partially deoiled hazelnut flour, a mixture of partially deoiled coconut flour, partially deoiled flax meal and partially deoiled pumpkin seed flour, a mixture of partially deoiled coconut flour, partially deoiled flax meal, partially deoiled hazelnut flour and partially deoiled pumpkin seed flour, a mixture of partially deoiled flax meal and partially deoiled pumpkin seed flour, or a mixture of partially deoiled flax meal, partially deoiled grapeseed flour and partially deoiled pumpkin seed flour.

In further preferred embodiments of the invention, the component a) comprises at least one flour of an edible nut or seed, in particular of a mixture of flours of different shell fruits.

In further preferred embodiments of the invention, the component a) comprises a mixture of at least one flour of an edible nut or seed, and at least one flour of a non-leguminous oil seed.

In further preferred embodiments of the invention, the component a) comprises at least one flour of an oil seed, in particular a mixture of flours of different oil seeds.

It is clear to a person skilled in the art that flours of carbohydrate-richer shell fruits can also be used in combination with shell fruits that are lower in carbohydrate, provided that this has advantageous effects on the desired taste or the desired consistency, and nevertheless the desired nutrient profile can be achieved.

Partially deoiled flours and/or brans of the corresponding shell fruits are advantageous for use in relatively large amounts of the main component, since, on account of their decreased fat content, they have a higher water binding capacity and ensure an improved consistency of the bakery products and farinaceous goods.

In a particular embodiment of the invention, the component a) is a partially deoiled flour that is prepared in whole or in part from the press cake that arises in the production of oil from said foods. Partially deoiled flours of shell fruits and/or oil seeds are obtained, e.g., by milling the press cake obtained in the oil production.

Of particular advantage for preparing breads and bread-like products is the use of partially deoiled almond flour, partially deoiled coconut flour, partially deoiled walnut flour, partially deoiled peanut flour, partially deoiled hazelnut flour and partially deoiled macadamia nut flour and likewise of partially deoiled pumpkin seed flour, partially deoiled sunflower seed flour, partially deoiled sesame seed flour and partially deoiled linseed flour, including partially deoiled golden linseed flour, and also all conceivable combinations thereof, since a particularly pleasant taste is achieved using these flours which can scarcely be differentiated from the taste of a conventional bread. The flours can be partially deoiled to different extents. Depending on the degree of deoiling, the fat content is reduced from over 50% to below 10%. The partially deoiled flours of shell fruits used in the context of this invention include all degrees of deoiling. However, preferably, partially deoiled flours are used having a fat content of <30%, in particular <20%, or <10%.

In particular embodiments of the invention, component a) is one or more flours selected from the group consisting of partially deoiled almond flour, partially deoiled coconut flour, partially deoiled walnut flour, partially deoiled peanut flour, partially deoiled hazelnut flour and partially deoiled macadamia nut flour, pumpkin seed flour, partially deoiled sunflower seed flour and partially deoiled linseed flour, including partially deoiled golden linseed flour, or one or more flours selected from the group consisting of partially deoiled almond flour, partially deoiled coconut flour, partially deoiled walnut flour, partially deoiled peanut flour, partially deoiled apricot kernel flour, partially deoiled hazelnut flour and partially deoiled macadamia nut flour.

In particular for preparing breads and bread-like products, by careful selection of the combination of the shell fruits and oil seeds, a pleasant mouth feel and taste can be achieved which resemble the texture and taste of a conventional bread.

Unsuitable for this purpose is, for example, the use of exclusively non-deoiled flour from almonds for the main component. Almonds contain more than 50% fat. The use of exclusively deoiled flour or more than 80% non-deoiled flour from almonds in the main component results in a significantly decreased water binding capacity of the dough, in such a manner that the product obtained therefrom has a consistency atypical of bread, and also an intense off-taste, which is suspected to be caused by the high fraction of vegetable oils. Furthermore, the use of exclusively non-deoiled almond flour results in a high-calorie food having a very high fat fraction. The same applies to the exclusive use of non-deoiled flours of other shell fruits or oil seeds, if they have a fat fraction of >50%. Accordingly, the component a) comprises at least one partially deoiled flour having a fat content less than 30% by weight in an amount of at least 20% by weight, in particular at least 50% by weight, especially at least 80% by weight, based on the total weight of the flour used as component a). Accordingly, the component a) comprises a maximum of 80%, in particular a maximum of 50%, especially a maximum of 20%, of non-deoiled flour from shell fruits and/or oil seeds having a fat fraction of >50%.

The use of exclusively coconut flour for the main component is likewise unsuitable, since coconut flour, in comparison with other flours of shell fruits (regardless of whether it is partially deoiled or not), has an extremely high water binding capacity. Products obtained therefrom likewise have an intense off-taste and a consistency atypical of bread that is expressed in an unnaturally dry mouth feel during consumption. Accordingly, the component a), based on the total weight of the components a), preferably comprises a maximum of 75%, in particular a maximum of 50%, of coconut flour.

The component b) of the composition according to the invention, hereinafter also termed the gel-forming component, comprises one or more mucilaginous polysaccharide-containing plant products and/or mucilaginous polysaccharides that have been isolated from said plant products. The mucilaginous polysaccharides of the gel-forming component absorb large amounts of liquid and form a gel which in part replaces the functional properties of gluten in doughs that are prepared from the composition according to the invention. The carbon dioxide that is liberated from the baking agent during processing and in the course of the baking process ensures an increase in the dough volume. However, for this purpose the dough must have a certain elasticity, as is the case with conventional, gluten-comprising doughs, a person skilled in the art here talks of "gas retention capacity" of the dough. A sufficient gas retention capacity of the low-carbohydrate and gluten-free dough may be achieved by targeted use of a suitable gel-forming component. In addition, the dietary fiber fraction of the composition according to the invention is increased by the gel-forming component, without, however, adversely affecting the taste of the bakery products and farinaceous goods prepared therefrom.

Suitable gel-forming components are, for example, plant products selected from the group consisting of psyllium products, for example psyllium, psyllium husks, blond psyllium or blond psyllium husks, seeds of the chia plants, for example Californian chia and Mexican chia, and also products therefrom, and seeds of the flax family, e.g. linseeds or golden linseeds, and also products therefrom. Particularly good baking results may be achieved by using psyllium or psyllium products, since these can even partially have a mucilaginous polysaccharide content of >20%.

Preferably, component b) is used without a special pre-treatment. The desired properties of the doughs may be achieved solely by the special combination according to the invention of the individual components.

In particular embodiments of the invention, the fraction of the component b) of the composition according to the invention is at least 5%, in particular at least 10%, based on the dry matter of the components a), b) and c), e.g. 5 to 40%, in particular 10 to 35%.

In further particular embodiments of the invention, the fraction of the component b) of the composition according to the invention is 5 to 20%, based on the dry matter, of the components a), b) and c).

In further particular embodiments of the invention, the fraction of the component b) of the composition according to the invention is 10 to 40%, especially 20 to 35%, based on the dry matter, of the components a), b) and c).

In a particular embodiment of the invention, the mucilage-comprising plant products are used in powder form, the grain size of which is <0.8 mm (>20 mesh).

In a particular embodiment of the invention, the component b) is (1) one or more plant products selected from the group consisting of psyllium, psyllium husks, blond psyllium, blond psyllium husks and/or (2) one or more mucilaginous polysaccharides isolated from said plant products. Especially, the component b) is psyllium husks or products obtained therefrom.

The component c) of the composition according to the invention, hereinafter also termed protein component, comprises in the dry matter at least 40% animal protein. Preferably, the protein component comprises 50% animal protein, particularly preferably 60%, and very particularly preferably 65% animal protein. The protein component has a plurality of functions in the doughs and bakery products and farinaceous goods prepared from the composition according to the invention. The protein component gives the dough an increased stability and water-binding capacity and, furthermore, contributes to a good taste of the bakery products and farinaceous goods. The protein which denatures in the course of the cooking or baking operation partially replaces the functional properties of the starch in carbohydrate-rich bakery products and farinaceous goods, since it ensures, for example, in the case of breads, a stable framework of the crumb.

Protein components according to the invention are, for example, egg products (eggs, egg white, whole egg powder, egg white powder), whey protein and milk protein. Particular preference for this application is given to eggs, egg white and egg products such as whole egg powder and egg white powder, since they give the finished bakery products and farinaceous goods a particularly pleasant taste. In particular, the combination of eggs, egg white or egg products with psyllium husks or products obtained therefrom, and especially the combination of egg white or egg white powder with psyllium husks or products obtained therefrom has proved to be particularly advantageous for the baking result.

In a particular embodiment of the invention, the fraction of the component c) of the composition according to the invention is at least 10%, based on the dry matter of the components a), b) and c), e.g. 10 to 40%.

In particular embodiments of the invention, the component c) is one or more protein components that are selected from the group consisting of eggs, egg products, whey products and milk products.

When the composition according to the invention is used, for example, for preparing breads, a crumb may be obtained that is comparable to the crumb of a gluten-comprising and carbohydrate-rich bread.

In a particular embodiment, the composition according to the invention additionally comprises edible plant components in whole or comminuted form that is different from a flour, e.g. in chopped or crushed form. Such edible plant components, hereinafter also termed component d), are, for example, legumes, shell fruits, oil seeds, gluten-free cereals and gluten-free pseudocereals.

In a particular embodiment, the composition according to the invention, in addition to the components a), b) and c), comprises, as component d), one or more shell fruits and/or oil seeds in whole, chopped or crushed form. This optional component d) has only a slight effect on the baking properties of the doughs prepared from the composition according to the invention and principally serves to refine the taste and mouth feel of the bakery products and farinaceous goods. Particularly suitable for this purpose are linseeds, sunflower seeds, sesame seed, poppy, peanuts, soy products, but these preferably in smaller amounts, preferably <15%, based on the total amount of the dry components of the composition according to the invention, buckwheat, gluten-free oat products, walnuts, almonds, pecan nuts, hazelnuts, brazil nuts, macadamia nuts, pistachios, pine kernels, pumpkin seeds, grape seeds, hemp seeds, pomegranate seeds, chia seeds, chickpeas and cashew nuts.

The fraction of the component d) can comprise up to 50% by weight, in particular up to 40% by weight, based on the total dry matter of the composition according to the invention. Where present, the fraction of component d) is in the range from 1 to 50% by weight, and in particular in the range from 2 to 40% by weight, based on the total dry matter of the compositions according to the invention.

In particular embodiments of the invention, the composition according to the invention comprises at least one of the component mentioned as component d) that is selected from the group consisting of legumes, oil seeds, shell fruits, gluten-free cereals, gluten-free pseudocereals.

In particular embodiments of the invention, the plant components are selected from the group consisting of linseeds, golden linseeds, sunflower seeds, sesame seed, chia seeds, poppy seeds, peanuts, buckwheat, gluten-free oat products, walnuts, almonds, coconuts, pecan nuts, hazelnuts, macadamia nuts, grape pips, pistachios, pine kernels, pumpkin seeds, hazelnuts, brazil nuts and cashew nuts.

Furthermore, the composition according to the invention can comprise further ingredients that are present as standard in bakery products and farinaceous goods and are very well known to those skilled in the art.

For use as a baking premix, the composition according to the invention generally additionally comprises salt and a baking agent. The baking agent preferably comprises a mixture of a) a gas-forming component such as, e.g. sodium hydrogen carbonate, potassium hydrogen carbonate, calcium carbonate or something comparable, b) an acid component such as, e.g. tartar, tartaric acid, pyrophosphates, glucono-delta-lactone, citric acid or something comparable and optionally c) a release agent such as, e.g., corn starch, potato starch, rice starch or a different gluten-free starch type, or dietary fiber flours such as gluten-free oat fiber, coconut fiber or something comparable. The baking agent can likewise be or comprise dried baker's yeast or dried gluten-free sourdough.

In a preferred embodiment, the compositions according to the invention additionally comprise one or more components from the groups of baking aids, sweeteners, fats and dietary fiber-comprising additives. Examples of baking aids are salt, the abovementioned baking agents, flavoring agents, spices, sweeteners, release agents and preservatives. Examples of dietary fiber-comprising additives are apple fiber, oat fiber, pea fiber, potato fiber, almond fiber, coconut fiber, cellulose fiber, rosehip seed fiber, blackberry seed fiber, pomegranate seed fiber and inulin, and/or in addition a vegetable protein isolate, for example rice protein, potato protein, pea protein, chia seed protein and/or hemp protein. The fats can be a vegetable fat and animal fat. The fraction of the further components is in the usual amounts for baking formulae. The total amount will generally not exceed 40% by weight based on the dry matter of the composition according to the invention, and is typically in the range from 1 to 40% by weight.

The composition according to the invention generally contains a maximum of 10%, based on the dry matter of the composition, of preservatives, stabilizers and acidity regulators such as, e.g., ascorbic acid, citric acid, tartaric acid, lactic acid, malic acid, guar seed meal, carob bean meal, arrowroot starch, rice starch, corn starch, pea starch, agar-agar, lecithins, pectins, alginates, xanthan, tara gum, gelatin and casein.

In particular embodiments, the compositions according to the invention additionally comprise at least one component selected from flavoring agents, spices and sweeteners. The flavoring agents and sweeteners are, e.g., cinnamon, coriander, fennel, anise, cardamom, vanilla, ginger, nutmeg, mace, garlic, pepper, chili spice, basil, oregano, curry, orange peel, lemon peel, star anise, caraway or onions. Suitable sweeteners are, e.g., sugar replacers such as erythritol, xylitol, sorbitol, mannitol, lactitol, Isomalt, and also high-intensity sweeteners such as acesulfame, aspartame, cyclamate, neohesperidin, neotame, saccharin, sucralose, stevioside, thaumatin and also something comparable. Particularly preferred sweeteners are erythritol and stevioside, since both are of natural origin. Sugar replacers preferably make up no more than 40%, in particular no more than 20%, of the composition.

In particular embodiments, the composition according to the invention, based on the dry matter of the composition, comprises 20 to 70% by weight of partially deoiled flour of shell fruits and/or non-leguminous oil seeds, 5 to 40% by weight, in particular 10 to 40% by weight, of psyllium husks and 4 to 40% by weight, in particular 10 to 40% by weight, of egg white powder or whole egg powder.

In particular embodiments, the composition according to the invention comprises, based on the dry matter, 30 to 70% partially deoiled flour of shell fruits, 5 to 20% psyllium husks, 4 to 20% egg white powder, 0 to 40% of component d), e.g. in the form of oil seeds or shell fruits, 0.1 to 6% salt and 1 to 6% baking agent.

In particular embodiments, the composition according to the invention, based on the dry matter, comprises 30 to 70% partially deoiled flour of shell fruits and/or non-leguminous oil seeds, 5 to 20% psyllium husks, 4 to 20% egg white powder, 0 to 40% of component d), e.g. in the form of oil seeds, 0.1 to 6% salt and 1 to 6% baking agent.

In further particular embodiments, the composition according to the invention, based on the dry matter, comprises 30 to 70% partially deoiled flour of non-leguminous oil seeds, 5 to 20% psyllium husks, 4 to 20% egg white powder, 0 to 40% of component d), e.g. in the form of oil seeds or shell fruits, 0.1 to 6% salt and 1 to 6% baking agent.

In further particular embodiments, the composition according to the invention, based on the dry matter, comprises 30 to 70% of a mixture of at least one partially deoiled flour of shell fruits and at least one partially deoiled flour of non-leguminous oil seeds, 5 to 20% psyllium husks, 4 to 20% egg white powder, 0 to 40% of component d), e.g. in the form of oil seeds or shell fruits, 0.1 to 6% salt and 1 to 6% baking agent.

In further particular embodiments, the composition according to the invention, based on the dry matter, comprises 20 to 50% partially deoiled flour of shell fruits and/or non-leguminous oil seeds, 20 to 40% of psyllium husks and 10 to 40% of whole egg powder and 0 to 40% of component d), e.g. in the form of fat. Such compositions are suitable, in particular, for the preparation of noodle dough and preferably comprise no, or less than 0.1%, baking agent.

In a particular embodiment, the components a), b) and c) and also optionally further ingredients of the composition according to the invention are exclusively dry ingredients. Such a particular embodiment is a dry baking mix.

The present invention also relates to bakery products or farinaceous goods that are prepared starting from a composition according to the invention, e.g. bread, bread-like foods, such as hot dog rolls, hamburger rolls, crispbread or hard-baked rolls, in addition pastries, biscuits, cakes, pies, pizza, waffles, pancakes, muffins, noodles, snacks, bars, crackers or flat cakes such as wraps. The compositions according to the invention can also be used for preparing noodle dough and thus for the preparation of noodles.

The components of the composition according to the invention are mixed with one another, mixed with a consumable liquid, for example water, milk, fruit juice etc., preferably with water, and baked or cooked.

In a particular embodiment of the invention, bakery products and farinaceous goods are prepared by mixing the dry baking premix according to the invention with water and subsequent shaping and baking thereof.

In a further particular embodiment of the invention, bakery products and farinaceous goods are prepared by mixing the dry baking premix according to the invention with water and subsequent cooking in boiling water.

In a particular embodiment of the invention, bakery products and farinaceous goods are prepared by mixing the dry baking premix according to the invention with water and subsequent drying for further storage.

In a particular embodiment, the composition according to the invention is processed with a consumable liquid to form a dough and cooked or baked by heating. In a particular embodiment, the consumable liquid is water. The dough obtained therefrom is baked at temperatures in the range from generally 100 to 230° C. The baking time in this case is preferably 30 to 180 minutes.

In a particular embodiment of the invention, the protein component is fresh eggs or egg powder. It is advantageous in this case when the fresh eggs are first separated into egg white and egg yolk and the egg white is processed to form beaten egg white, or, if the egg powder is egg white powder, this is mixed with water and processed to form beaten egg white before the remaining ingredients are mixed therewith.

In a particular embodiment, the composition according to the invention, in which the component c) is fresh eggs or egg white powder, is processed as follows: the fresh eggs are separated, the egg white or egg white powder is (optionally with water) beaten to form beaten egg white, then processed with water and the remaining ingredients of the composition according to the invention to form a dough and baked at 100-230° C. for 30-180 minutes.

In a particular embodiment of the invention, furthermore, one or more of the following ingredients are added to the composition according to the invention: vegetable fat, animal fat, vinegar, fruit juices, milk products, gluten-free sourdough, vitamins, minerals, enzymes, additives for the technological improvement of processing for the industrial preparation of bakery products and farinaceous goods, fruits, vegetables, fresh yeast.

In a preferred embodiment of the invention, the composition comprises one or more of the following components:
a) as component a), at least one flour that is selected from among partially deoiled almond flour, partially deoiled coconut flour, partially deoiled linseed flour, partially deoiled walnut flour, partially deoiled hazelnut flour, partially deoiled sesame seed flour, partially deoiled pumpkin seed flour, partially deoiled grape kernel flour,
b) as component b), milled psyllium husks or whole psyllium husks,
c) as component c), hen's egg white,
d) as component d), one or more plant components that are selected from pumpkin seeds, linseeds, sunflower seeds, sesame seed, poppy seed, peanuts and apple fiber,
e) baking powder and salt.

Such a composition is suitable for preparing bakery products and farinaceous goods that have the following nutrient profile: energy <approximately 250 kcal, >approximately 10% protein, <approximately 6% carbohydrates, <approximately 10% fat. They are therefore suitable for use in the context of a reduced-carbohydrate, reduced-calorie, reduced-fat and gluten-free dietary habit.

In a preferred embodiment of the invention, the composition comprises one or more of the following components:
a) as component a), at least one flour that is selected from partially deoiled almond flour and partially deoiled coconut flour,
b) as component b), ground psyllium husks or whole psyllium husks,
c) as component c), hen's egg white,
e) baking powder and salt.

Such a composition is suitable for preparing bakery products and farinaceous goods that have the following nutrient profile: energy approximately 120-180 kcal, approximately 10-15% protein, approximately 2-6% carbohydrates, <approximately 6% fat and, therefore, are very particularly suitable for use in the context of a reduced-carbohydrate, reduced-calorie, reduced-fat and gluten-free dietary habit.

In a further particular embodiment of the invention, the composition comprises one or more of the following components:
a) as component a), at least one flour that is selected from partially deoiled almond flour, partially deoiled coconut flour, partially deoiled linseed flour, partially deoiled walnut flour, partially deoiled hazelnut flour, partially deoiled sesame seed flour, partially deoiled pumpkin seed flour, partially deoiled grape kernel flour, partially deoiled macadamia nut flour, partially deoiled hazelnut flour, partially deoiled apricot kernel flour and partially deoiled peanut flour,
b) as component b), ground psyllium husks or entire psyllium husks,
c) as component c), hen's egg white,
d) as component d), apple fiber,
e) baking powder and salt.

Bakery products and farinaceous goods made from such a composition have the following nutrient profile: energy approximately 120-180 kcal, protein approximately 10-15%, carbohydrates approximately 2-6%, fat <approximately 6% and are very particularly suitable for use in the context of a reduced-carbohydrate, reduced-calorie, reduced-fat and gluten-free dietary habit.

In the context of this application, the statement "approximately" means that the stated percentage fractions need not be present exactly in the composition, but that slight deviations above or below the numbers indicated may also be present inter alia, but not exclusively, due to nutrient fluctuations in natural products.

The bakery products and farinaceous goods prepared from the composition according to the invention are suitable for the therapeutic or preventive treatment of diseases that are related to a high consumption of sugar and starch or are connected with a gluten intolerance or in which an avoidance of gluten and/or a restriction of carbohydrate consumption is considered to be advantageous, such as, e.g. diabetes type I and II, celiac disease, inflammatory gut diseases such as Crohn's disease and ulcerative colitis, gut diseases such as leaky-gut syndrome, metabolic syndrome, obesity, neurodegenerative diseases, tumors and diseases that are caused by inflammatory processes, such as rheumatism and rheumatoid arthritis.

The invention therefore also relates to the bakery products and farinaceous goods according to the invention for treatment and prevention of diseases.

Therefore, a health-promoting activity is achieved with the composition according to the invention.

Of course, the abovementioned features which are still to be explained hereinafter are usable not only in the respectively stated combination, but also in other combinations or else alone, without departing from the scope of the present invention.

An embodiment of the invention will be described in more detail in the examples hereinafter and compared with the prior art. The embodiments explained in more detail are breads each of which is prepared from a baking premix comprising the composition according to the invention.

For this purpose, first a baking premix is prepared from the ingredients listed hereinafter (example 1-6) and processed with the stated amount of water to form a dough.

EXAMPLE 1

70 g of partially deoiled almond flour, 60 g of partially deoiled linseed flour, 60 g of sunflower seeds, 20 g of linseeds, 10 g of grape kernel flour, 25 g of psyllium husks, 30 g of egg white powder, 18 g of baking powder, 6 g of salt, 420 g of water.

EXAMPLE 2

85 g of partially deoiled almond flour, 25 g of partially deoiled coconut flour, 10 g of partially deoiled linseed flour, 5 g of sesame seed flour, 30 g of psyllium husks, 25 g of egg white powder, 18 g of baking powder, 6 g of salt, 400 g of water.

EXAMPLE 3

100 g of partially deoiled almond flour, 35 g of partially deoiled coconut flour, 30 g of psyllium husks, 35 g of egg white powder, 15 g of baking powder, 8 g of salt, 390 g of water.

EXAMPLE 4

40 g of partially deoiled coconut flour, 45 g of partially deoiled golden linseed flour, 20 g of partially deoiled hazelnut flour, 40 g of partially deoiled pumpkin seed flour, 30 g of egg white powder, 30 g of psyllium husks, 15 g of baking powder, 6 g of salt, 400 g of water.

EXAMPLE 5

45 g of partially deoiled golden linseed flour, 40 g of partially deoiled linseed flour, 40 g of partially deoiled pumpkin seed flour, 5 g of partially deoiled pumpkin seed flour, 20 g of apple fiber, 25 g of egg white powder, 25 g of psyllium husks, 15 g of baking powder, 8 g of salt.

EXAMPLE 6

40 g of partially deoiled coconut flour, 40 g of partially deoiled sunflower seed flour, 25 g of partially deoiled sesame seed flour, 35 g of partially deoiled golden linseed flour, 40 g of egg white powder, 30 g of psyllium husks, 15 g of baking powder, 6 g of salt.

The ingredients are mixed thoroughly and then admixed with a defined amount of water and stirred until a homogeneous dough is formed. The dough is baked in a preheated baking oven at 175° C. for about 60 minutes and is then allowed to cool on a grating.

The breads resulting therefrom have the nutrient profiles listed in table 1 (example 1-3).

For comparison of the nutrient profiles, various baking premixes from the prior art (baking premixes 4 to 8) were used.

1.) Example bread 1 from a baking premix according to the invention according to example 1
2.) Example bread 2 from a baking premix according to the invention according to example 2
3.) Example bread 3 from a baking premix according to the invention according to example 3
4.) Comparison bread 1: farmhouse crusty bread (manufacturer: Aurora Mühlen GmbH, Hamburg)
5.) Comparison bread 2: bread-mix mix B/formula for tin-baked bread (manufacturer: Dr. Schar AG, Burgstall)
6.) Comparison bread 3: gluten-free low-carb white bread (manufacturer: Erdschwalbe Bioprodukte Thomas Zimmermann, Neu-Ulm)
7.) Comparison bread 4: protein bread (manufacturer: Küchenmeister, Frießinger Mühle GmbH, Bad Wimpfen)
8.) Comparison bread 5: seeded farmhouse bread, gluten-free (manufacturer: Hanneforth food for you GmbH & Co. KG, Horn-Bad Meinberg)

As can be seen from table 1, the three example breads prepared from the composition according to the invention (example breads 1, 2 and 3) have the nutrient profile described in the objective (carbohydrates <15%, preferably <10%, protein >10%, fat 1%-40%). The carbohydrate content is reduced in comparison with the conventional bread (carbohydrate-rich and gluten-comprising) from baking premix 4 (at over 40%) to approximately 3-5%. In contrast, the gluten-free bread from baking premix 5 even has a carbohydrate fraction of above 70%, whereas the likewise gluten-free bread from baking premix 8, although having fewer carbohydrates than the breads from baking premixes 4 and 5, still has more than 30% carbohydrates. Although the bread from baking premix 7 has a nutrient profile that corresponds with the objective, this baking premix for a large part is composed of gluten. Only the bread from baking premix 6 has a nutrient profile that corresponds to the objective.

TABLE 1

Constituents and nutrient profile of the breads according to the invention (1-3) compared with the prior art (4-8)

| BPM | Constituents (according to details on the packaging or according to the formula) | Energy [kJ (kcal)] | Carbo-hydrates [g] | Protein [g] | Fat [g] | Low-gluten or gluten-free |
|---|---|---|---|---|---|---|
| 1 | Almond flour (partially deoiled), linseed flour (partially deoiled), grape kernel flour (partially deoiled), sunflower seeds, linseeds, psyllium husks, egg white powder, baking powder, salt (example 1). | 720 (172) | 3.3 | 15.0 | 8.6 | yes |
| 2 | Almond flour (partially deoiled), coconut flour (partially deoiled), linseed flour (partially deoiled), sesame seed flour (partially deoiled), psyllium husks, egg white powder, baking powder, salt (example 2). | 631 (151) | 4.2 | 17.7 | 4.3 | yes |
| 3 | Almond flour (partially deoiled), coconut flour (partially deoiled), psyllium | 540 (129) | 3.5 | 15.5 | 3.5 | yes |

TABLE 1-continued

Constituents and nutrient profile of the breads according to the invention (1-3) compared with the prior art (4-8)

| BPM | Constituents (according to details on the packaging or according to the formula) | Mean nutrient profile per 100 g of ready-to-eat bread | | | | Low-gluten or gluten-free |
|---|---|---|---|---|---|---|
| | | Energy [kJ (kcal)] | Carbohydrates [g] | Protein [g] | Fat [g] | |
| | husks, egg white powder, baking powder, salt (example 3). | | | | | |
| 4 | Wheat flour (59%), rye flour, dried sourdough (3%), iodized salt, wheat bran, grape sugar, dried yeast (1.4%), malt flour, ascorbic acid, folic acid (comparative example). | 984 (232) | 46.5 | 7.3 | 1.0 | no |
| 5 | Cornstarch, rice flour, lupin protein, dextrose, apple fiber, thickener: hydroxypropylmethylcellulose, salt (comparative example). | 1461 (345) | 77 | 3.7 | 1.1 | yes |
| 6 | Soy flour, gluten-free oat dietary fiber, pea protein, psyllium husks, baking powder, salt (comparative example). | 633 (153) | 1.7 | 13.4 | 6.0 | yes |
| 7 | Wheat protein, soy flour (20%), soybean meal (10%), whole grain spelt flour, linseeds, sunflower seeds, sesame seed, rye flour, wheat bran, dried sourdough (rye flour, fermented), dried yeast, cooking salt, malted barley flour (comparative example). | 1053 (252) | 8.0 | 24.0 | 11.8 | no |
| 8 | Rice flour, seeds (20%: linseeds, sunflower seeds, pumpkin seeds), apple fiber, buckwheat flour, cooked banana flour, inulin, fat powder (non-hardened palm fat), egg white powder, dried baker's yeast, salt, citric acid (comparative example). | 994 (235) | 32.7 | 7.7 | 7.2 | yes |

BPM = baking premix

For comparison of the organoleptic properties, the corresponding breads were prepared from the baking premixes examples 1 to 3 and also the baking premixes 4 to 8 according to the prior art and compared with an example of the bread according to the invention (comprising the composition according to the invention). The selection of the baking premixes of the prior art proceeded according to the condition that the breads to be prepared therefrom should be similar bread types. Specifically, this means that, for example, the bread according to the invention from example 3 gave a light, mild-tasting bread that resembles a conventional light wheat mixed bread; correspondingly, therefore, for the comparative examples a commercially conventional wheat mixed bread "Aurora Bauernkruste" [Aurora farmhouse crusty bread] (baking premix 4) was selected. Furthermore, the "Schär Brot-Mix" [Schär bread mix] (baking premix 5) and also "Erdschwalbe Glutenfreies Low-Carb Weißbrot" [Erdschwalbe gluten-free low-carb white bread] (baking premix 6) were selected.

In order to permit a meaningful comparison with the prior art, the following comparative experiment was carried out:

From the baking premixes to be studied, in each case a bread dough was prepared according to the instructions provided therefor. Then, exactly 500 g of the prepared bread dough were placed into a mold having dimensions width×depth×height 15×5×7 cm, distributed uniformly and the fill height in the baking mold was measured. Then the breads were baked to completion in a commercially conventional baking oven according to instructions.

After cooling of the finished bread, the fill height in the baking mold was again measured. Furthermore, the specific density of the breads was determined by measuring weight and volume. The volume measurement was carried out on the basis of the rapeseed displacement method (volumeter according to Fornet, also described in AACCI Method 10-05.01) as follows: the bread loaf was placed in a measuring beaker of suitable size, the free space of the vessel was filled with sesame seeds until the bread loaf was at least completely covered and the volume then read off. Then the bread loaf was removed and the volume of the same amount of sesame seeds determined. The difference between the two volumes gives the volume of the bread loaf. The specific density is obtained by dividing the measured volume by the measured weight; the specific volume is the reciprocal of the specific density.

For further assessment, a 1 cm-thick slice was cut from the center of the loaf and assessed according to shape, appearance, color, consistency, texture and taste. The assessment was carried out on the basis of the criteria of the DLG 5-point scheme for bread (Deutsche Landwirtschafts-Gesellschaft e.V. [German Agricultural Society]).

Furthermore, in addition, the preparation of the breads from the baking premixes was assessed for simplicity, handling and time.

The results of the comparative experiments are summarized in table 2.

As can be seen from table 2, using the composition according to the invention, here shown for the example of a bread baking premix, one bread (example 3) is obtained, the organoleptic properties of which very largely correspond to those of a conventional wheat mixed bread (example 4). In some points, such as the preparation speed and the crust properties, the bread from the composition according to the invention (example 3) is even superior to the conventional wheat mixed bread (example 4).

In comparison with the likewise gluten-free, but carbohydrate-rich bread of example 5, the bread from the composition according to the invention (baking premix according to example 3) shows marked advantages in the majority of the assessment categories which may be summarized such that the organoleptic properties of the bread from baking premix 5 are far removed from those of the conventional bread (baking premix 4). Taste and specific density of the bread are an exception—here the baking premix of example 3 according to the invention achieves a similar result as the breads from the baking premixes 4 and 5 of the prior art.

The bread from baking premix 6 differs in virtually all assessment categories markedly from all other examples, and in all categories from the conventional wheat mixed bread of baking premix 4. Particular emphasis must be given to the overall very compact structure with virtually completely missing bread rise, which may also be clearly read off from the measured specific density (increased 1.7 times in comparison with the conventional bread from baking premixes 4) and the slight height difference before and after baking. Furthermore, the intensive off-taste and also the odor of soy flour are defects. The only positive aspect to be mentioned is the simple mode of preparation which proceeds comparatively rapidly to that for example 3.

TABLE 2

Comparison of the organoleptic properties

| Baking premix | 3 | 4[+] | 5[+] | 6[+] |
|---|---|---|---|---|
| Preparation | Mix the baking mix with water and briefly stir, a readily shaped dough forms | Two relatively long dough rests are required, dough easy to form | Mix baking mix with water, a viscous sticky mass forms that is difficult to place into the mold, relatively long dough resting time necessary | Mix the baking mix with water and briefly stir, a readily shaped dough forms |
| Time spent before baking | 5 min | 1 hour | 30 min | 5 min |
| Height difference before*/after baking [cm] | 3.7 | 3.8 | 5 | 1.5 |
| Specific density [g/cm$^3$] | 0.44 | 0.42 | 0.41 | 0.71 |
| Specific volume [cm$^3$/g] | 2.30 | 2.38 | 2.45 | 1.42 |
| Crust color | Gold-brown | Dark gold-brown | Beige-white (atypical of bread) | Gold-yellow |
| Surface and crust | Even surface, flexible and stable crust | Crater formation on the top side, otherwise uniform surface, hard crust | Uneven surface with white cracks, very hard crust | Even surface, flexible and stable crust |
| Bread rise and crumb pattern | Good bread rise, uniform crumb pattern, uniform pore size distribution | Good bread rise, uniform crumb pattern, uniform pore size distribution | Excess bread rise, uneven pore size distribution (larger pores at the top, more compact structure below) | Low bread rise, crumb pattern not typical of bread |
| Structure and elasticity | Stable crumb with bread-typical elasticity, bread-typical fracture | Stable crumb with bread-typical elasticity, bread-typical fracture | Stable crumb with atypically low elasticity for bread, breaks earlier on extension or flexion than 3 and 4 | Very compact structure, little elasticity, breaks immediately on extension or flexion |
| Consistency and mouth feel | Typical of bread, comparable to 4 | Typical of bread | Floury | Atypical of bread, gum-like |
| Odor | Mild, bread-type odor, reminiscent of a light wheat bread | Bread-typical odor, pleasant yeast note, mild | Bread-typical odor, pleasant yeast note, mild | Strong odor of soy flour, atypical of bread |
| Taste | Mild taste, reminiscent of a light wheat bread, neutral to unremarkable, weak almond aroma | Bread-typical taste, pleasant yeast note, mild | Pleasant yeast note, typical bread taste neutral to unremarkable | Atypical of bread, strong off-taste of soy |
| Overall impression | Scarcely differentiable from the standard, conventional bread, preparation very simple | "Standard" conventional bread | Unnatural food, only to be considered with limitations as a substitute for standard bread | Absolutely atypical bread appearance, intensive odor and taste of soy |

*In the case of the breads that experience an increase in volume during the dough resting before baking, the dough height was determined before the dough rest.
[+]Prior art In summary, from the comparative experiments carried out and the nutrient comparison, the following statements may be made: of the breads of the prior art, some have a low carbohydrate content, but most are not gluten-free. Of the breads that are gluten-free, most have a high carbohydrate content. The bread of this type studied more exactly of bread premix 5, however, differs in its organoleptic properties in some points from the conventional wheat mixed bread considered as standard (baking premix 4). Only the bread from one manufacturer (baking premix 6) is comparable in its nutrient profile to the breads according to the invention (example 1, 2 and 3) that were prepared from the composition according to the invention. However, example 6 differs in its organoleptic properties so greatly from the conventional wheat mixed bread considered as standard (baking premix 4) that it is scarcely suitable for an acceptable substitute for conventional bread in the context of a low-carbohydrate and gluten-free dietary habit.

In contrast, the breads according to the invention (example 1, 2 and 3) that were prepared from the composition according to the invention exhibit the nutrient profile demanded in the objective, may be prepared simply and rapidly, and have organoleptic properties that are equivalent to a conventional bread.

The invention claimed is:

1. A composition for preparing bread and bread-like products, wherein the bread-like products are selected from the group consisting of hot dog rolls, hamburger rolls, crispbread, hard-baked rolls, pastries, biscuits pie crusts, pizza crusts, muffins, crackers and wraps, which comprises components a), b) and c) as follows:
   a) flour obtained from one or more shell fruits and/or oil seeds of non-legumes, in an amount of from 20 to 80% by weight, based on dry matter of the components a), b) and c), wherein the flour comprises at least one partially deoiled flour, having a fat content of less than 30% by weight, in an amount of at least 20% by weight, based on the total weight of the flour,
   b) a mucilaginous polysaccharide-comprising plant product or mucilaginous polysaccharides isolated from said plant products in an amount of from 5 to 40% by weight, based on dry matter of the components a), b) and c), and
   c) a protein component that is selected from eggs, egg white and egg products, wherein the egg products are selected from whole egg powder and egg white powder, in an amount of from 4 to 40% by weight, based on dry matter of the components a), b) and c),
   wherein the component a) comprises a maximum of 75% by weight of component a) of coconut flour,
   wherein the fraction of the total amount of the components a), b) and c) of the composition, in each case calculated as dry matter of the components a), b) and c), of the total dry matter of the composition is at least 60% by weight,
   wherein the composition comprises less than 15% of soy products, based on the total amount of the dry components of the composition, and
   wherein the composition comprises a maximum of 0.1% by weight of gluten.

2. The composition according to claim 1, characterized in that it comprises less than 20 mg/kg of gluten.

3. The composition according to claim 1, wherein the shell fruits are selected from the group consisting of almonds, coconuts, apricot kernels, mango kernels, pomegranate seeds, peach stones, pecan nuts, pistachios, walnuts, chestnuts, hazelnuts, beechnuts, acorns, hemp nuts, macadamia nuts, ivory nuts, water chestnuts, peanuts, cashew nuts, pine kernels and brazil nuts, and wherein the oil seeds are selected from linseeds, golden linseeds, sunflower seeds, pumpkin seeds, sesame seeds, chia seeds and poppy seeds.

4. The composition according to claim 1, characterized in that component a) is a partially deoiled flour having a fat content of less than 30% by weight.

5. The composition according to claim 1, characterized in that component a) is one or more flours that are selected from the group consisting of partially deoiled almond flour, partially deoiled coconut flour, partially deoiled walnut flour, partially deoiled peanut flour, partially deoiled apricot kernel flour, partially deoiled hazelnut flour, partially deoiled macadamia nut flour, partially deoiled linseed flour, partially deoiled golden linseed flour, partially deoiled pumpkin seed flour, partially deoiled sesame seed flour, partially deoiled poppy flour and partially deoiled sunflower seed flour.

6. The composition according to claim 1, wherein the component a) comprises a maximum of 75% by weight, based on the component a), of coconut flour.

7. The composition according to any one of claim 1, wherein the component a) comprises a maximum of 10% by weight, based on the component a), of soy flour.

8. The composition according to claim 1, wherein the component a) comprises at least 25% by weight, based on the component a), of partially deoiled almond flour.

9. The composition according to claim 1, characterized in that component b) is
   (1) one or more plant products selected from the group consisting of psyllium, psyllium husks, blond psyllium and blond psyllium husks, and/or
   (2) one or more mucilaginous polysaccharides isolated from said plant products.

10. The composition according to claim 1, characterized in that it further comprises one or more edible plant components in whole or comminuted form that is different from a flour, wherein the edible plant components are selected from the group consisting of legumes, oil seeds, shell fruits, gluten-free cereals and gluten-free pseudocereals.

11. The composition according to claim 10, characterized in that the plant components are selected from the group consisting of linseeds, golden linseeds, sunflower seeds, sesame seed, chia seeds, poppy seeds, peanuts, buckwheat, gluten-free oat products, coconuts, walnuts, almonds, pecan nuts, hazelnuts, macadamia nuts, grape pips, pistachios, pine kernels, pumpkin seeds, hazelnuts, brazil nuts and cashew nuts.

12. The composition according to claim 1, characterized in that it additionally comprises one or more components selected from the group consisting of salt, baking agents, flavoring agents, spices, sweeteners, vegetable fats and animal fats, and/or additives additionally comprising dietary fiber, selected from the group consisting of apple fiber, oat fiber, pea fiber, potato fiber, almond fiber, coconut fiber, cellulose fiber, rosehip seed fiber, blackberry seed fiber, pomegranate seed fiber and inulin, and/or in addition a vegetable protein isolate selected from the group consisting of rice protein, potato protein, pea protein, chia seed protein and hemp protein.

13. The composition according to claim 1, characterized in that the component c) is egg white powder.

14. The composition according to claim 1, characterized in that, based on the dry matter of the composition, it comprises 20-70% by weight of partially deoiled flour of shell fruits and/or non-leguminous oil seeds, 5-40% by weight of psyllium husks and 4-40% by weight of egg white powder or whole egg powder.

15. The composition according to claim 1, characterized in that, based on the dry matter of the composition, it comprises 30-70% by weight of partially deoiled flour of shell fruits, 5-20% by weight of psyllium husks, 4-20% by weight of egg white powder, 0-40% by weight of oil seeds, and further comprises 0.1-6% by weight of salt and 1-6% by weight of baking agent.

16. The composition according to claim 1, characterized in that the component c) is fresh eggs.

17. The composition according to claim 1 in the form of a baking premix.

18. The composition according to claim 1 in the form of a first composition comprising the components a) and b), and a second composition comprising the component c).

19. A method for preparing bread and bread-like products according to claim 1, comprising adding a consumable liquid to the composition according to claim 1 to form a dough and heating the dough to cook or bake the dough, thereby preparing bread and bread-like products.

20. The method according to claim 19, further comprising adding to the composition one or more ingredients selected from the group consisting of water, vegetable fat, animal fat, vinegar, fruit juices, milk products, gluten-free sourdough, vitamins, minerals, enzymes, additives for the technological improvement of the processing for the industrial preparation of bread and bread-like products, fruits, mushrooms, vegetables and fresh yeast.

21. The method according to claim 19, characterized in that the consumable liquid is water and the dough is baked at 100-230° C. for 30-180 minutes.

22. Bread and bread-like products, wherein the bread-like products are selected from the group consisting of hot dog rolls, hamburger rolls, crispbread, hard-baked rolls, pastries, biscuits, pie crusts, pizza crusts, muffins, crackers and wraps, produced from a composition according to claim 1.

23. Bread and bread-like products, wherein the bread-like products are selected from the group consisting of hot dog rolls, hamburger rolls, crispbread hard-baked rolls, pastries, biscuits, pie crusts, pizza crusts, muffins, crackers and wraps, prepared by a method according to claim 19.

24. The bread and bread-like products according to claim 1 or claim 22, wherein the bread-like product is selected from the group consisting of hot dog rolls hamburger rolls, crispbread, hard-baked rolls, biscuits, pie crusts, pizza crusts, muffins, crackers and wraps.

25. The bread and bread-like products according to claim 22, having a nutrient profile of <10% carbohydrates, >10% protein and 1-40% fat.

26. The bread and bread-like products according to claim 22 for use in the therapeutic or preventive treatment of diseases selected from the group consisting of diseases connected with a high consumption of sugar and starch, diseases connected with a gluten intolerance, diseases in which avoidance of gluten and/or restriction of carbohydrate consumption is considered advantageous, and diseases that are caused by inflammatory processes.

* * * * *